United States Patent [19]

Hudson, Jr.

[11] 4,378,579

[45] Mar. 29, 1983

[54] ALTERNATELY LOW AND HIGH INPUT-IMPEDANCE DETECTOR FOR USE IN A GFI

[75] Inventor: Edward C. Hudson, Jr., Putnam, Conn.

[73] Assignee: Sprague Electric Company, North Adams, Mass.

[21] Appl. No.: 205,034

[22] Filed: Nov. 7, 1980

[51] Int. Cl.³ ............................................. H02H 3/32
[52] U.S. Cl. ................................. 361/45; 361/42
[58] Field of Search ............................ 361/42, 45, 44, 46

[56] References Cited

U.S. PATENT DOCUMENTS

| 3,879,639 | 4/1975 | Sircom | 317/18 D |
| 3,963,959 | 6/1976 | Howell | 317/9 R |
| 3,973,171 | 8/1976 | Howell | 317/18 D |
| 4,001,646 | 1/1977 | Howell | 317/18 D |
| 4,285,022 | 8/1981 | Lewiner et al. | 361/45 |

*Primary Examiner*—Reinhard J. Eisenzopf

[57] ABSTRACT

A ground fault interrupter employs a single differential transformer that is made of a ferrite toroid with an eleven turn secondary winding. The transistorized fault detector circuit is for the most part formed on a silicon integrated chip. The hot-wire-to-ground-fault detector portion is an impedance-transforming circuit that when energized presents a low impedance, i.e. virtually a short circuit, to the secondary winding. A multiplexing circuit periodically de-energizes the hot-wire-to-ground-fault detector causing it to present a high input impedance during periods when neutral-wire-to-ground faults are sensed via the transformer.

24 Claims, 15 Drawing Figures

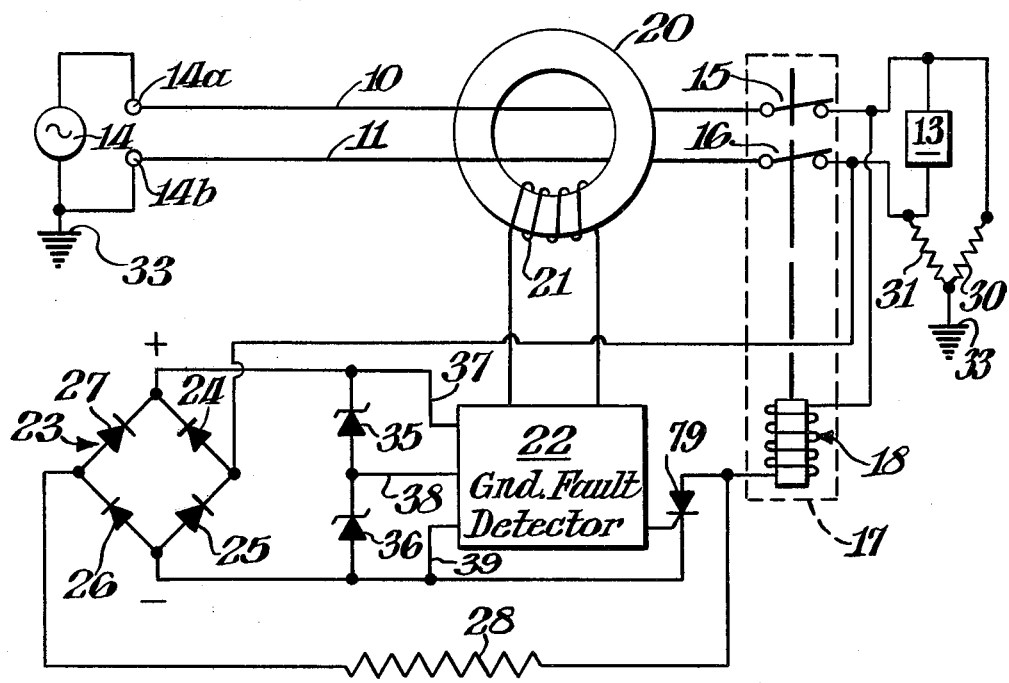
Fig.1 (Prior Art)
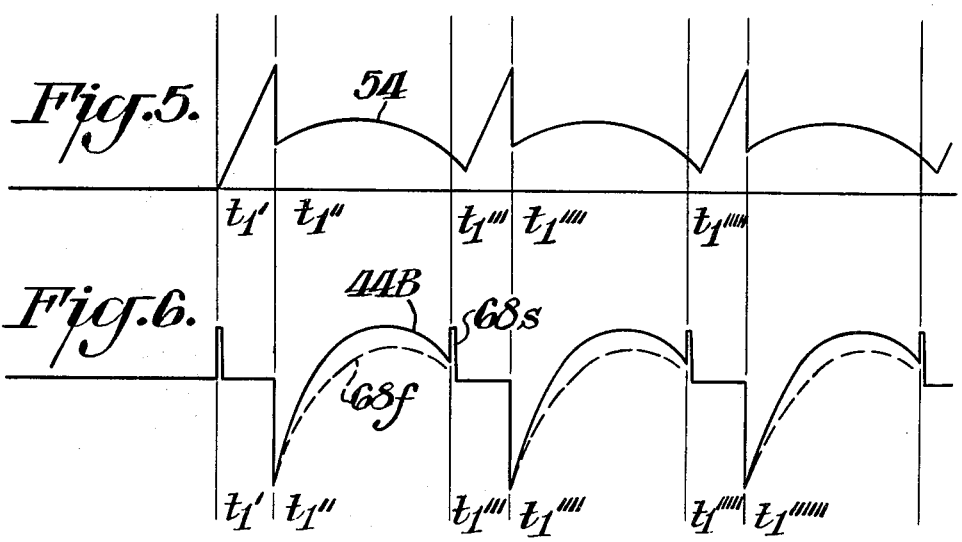
Fig.5.
Fig.6.
Fig.14.

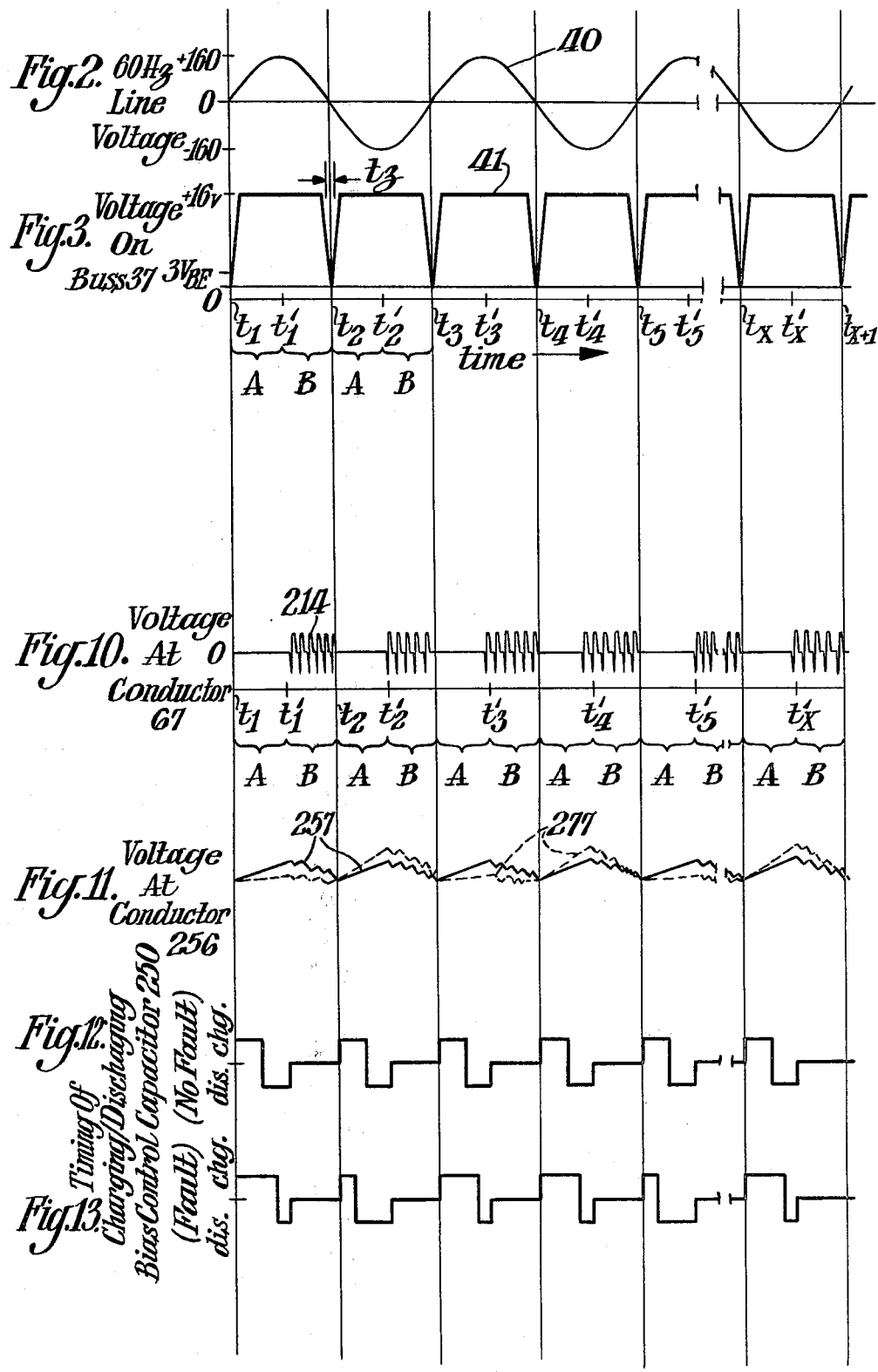

ALTERNATELY LOW AND HIGH INPUT-IMPEDANCE DETECTOR FOR USE IN A GFI

BACKGROUND OF THE INVENTION

This invention relates to a ground fault interrupter (GFI) and more particularly to such a GFI capable of using a single differential transformer core and capable of actuating a circuit breaker when either a hot-line to ground fault (H-GF) or a neutral-line to ground fault (N-GF) occurs.

Ground fault interrupters may have the features illustrated in FIG. 1. A hot line 10 and a neutral line 11 connect an electrical load 13 to an AC power source 14 at terminals 14a and 14b through the switches 15 and 16 of an electromechanical breaker 17. The breaker 17 includes an actuating solenoid 18.

The power lines 10 and 11 are threaded through a toroidal magnetic core 2-having a multi-turn secondary winding 21. The secondary winding 21 is connected to a ground fault detector circuit 22 that receives electrical energy from lines 10 and 11 through a full wave rectifier bridge circuit 23 including diodes 24, 25, 26 and 27 and resistor 28.

Resistor 30 represents a hot line to ground fault (H-GF) while resistor 31 represents a neutral line to ground fault (N-GF). Resistor 30 may further represent a human body, for example one standing on a damp floor and touching the metal housing of an electrical appliance (not shown) that is shorted to the hot line. When a hot line fault (H-GF) 30 exists, some of the current in hot line 10 does not return to the source 14 via neutral line 11 but rather is diverted around the core 20 through ground 33 to source 14. In this event the excess of current in line 10 over that in line 11 generates a magnetic field in core 20 and induces a hot line to ground fault voltage at secondary winding 21, that is proportional to the fault current in resistor 30. If this voltage exceeds a predetermined safe limit, the detector 22 trips the breaker 17 and removes the load 13 from the AC source. It is customary to use a differential transformer having a secondary winding 21 having hundreds of turns so that the primary to secondary voltage step up ratio makes fault detection simpler. This requires the use of a stable core (20) material, usually an iron-nickel alloy, leading to a relatively high cost transformer. When detecting circuits are largely integrated, the transformer represents a major cost element in the G.F.I.

If a N-GF 31 also exists, some of the fault current flowing through H-GF 30 may be returned to neutral line 11 thus reducing the H-GF induced voltage at winding 21 and rendering the H-GF detection system ineffective. Thus such a fault (N-GF) is not itself a hazard but potentially disables the hot fault (H-GF) detector.

H-GF currents in excess of 6 milliamperes are considered potentially lethal and a class A GFI as defined by Underwriters Laboratories is required to trip the breaker 17 within a time T for a fault current I between 6 and 264 milliamperes, where $$T = \left(\frac{20}{I}\right)^{1.43} \text{ seconds.}$$

This amounts to 5.6 seconds and 30 milliseconds (about two cycles of a 60 Hz line) corresponding to the 6 and 264 milliamperes, respectively. Neutral line to ground faults of less than 2 ohms are considered by Underwriters Laboratories as being capable of desensitizing an imbalanced-load-current type fault detector system as described above to an unacceptable level.

The requirement for fast tripping in response to a H-GF or a N-GF is especially difficult to meet, considering the relatively high load currents that may flow in power lines 10 and 11 and considering the not infrequent presence on these lines 10 and 11 of large amplitude impulse high frequency noise signals. Such noise tends to interfere with the sensitive detector circuits and then often trips the breaker when no fault exists at all. The high voltage step-up ratio of conventional GFI differential transformers that makes fault detection simpler, also makes nuisance tripping due to noise more difficult to avoid. The H-GF current $I_{30}$ produces a voltage at the H-GF voltage detector of $$\left(\frac{N_2}{N_1}\right) L_p \frac{di\,(\text{fault})}{dt} \text{ or } \frac{N_2}{N_1} L_p \frac{d}{dt} (I_{30} \sin 2\pi \text{ ft})$$

where $N_2/N_1$ is the winding step-up ratio, $L_p$ is the primary inductance (e.g. of winding 10) and $I_{30}$ is the peak fault current at line frequency f, usually 50 Hz or 60 Hz. With such a system, noise current spikes, containing much higher-frequency energy, are greatly magnified through the transformer.

A large number of secondary turns tends to increase the interwinding capacitance between primary lines 10 and 11 and secondary winding 21, which more freely transmits line voltage spikes to the sensitive H-GF detector.

It is an object of the present invention to provide a low cost but reliable and fast responding ground fault interrupter.

It is another object of this invention to provide a GFI having a H-GF current amplifier that presents an extremely low input impedance so that the differential transformer serves as a current transformer.

It is a further object of this invention to provide a ground fault interrupter capable of employing a single low cost non-critical differential transformer.

It is yet another object of this invention to provide a GFI having a N-GF detector that samples a N-GF related voltage a plurality of times during a portion of every cycle of the power line frequency and provides a signal proportional to the average value of the plurality of samples so as to be substantially insensitive to noise.

SUMMARY OF THE INVENTION

In a ground fault interrupter employing a single differential transformer, the ground fault detector of this invention is connected to the transformer secondary winding. This ground fault detector alternately senses the presence of hot-line-to-ground faults and senses the presence of neutral-line-to-ground faults, presenting to the secondary winding a low impedance and a high impedance, respectively.

The detector includes an impedance-transforming signal transmitting means serving as the hot-line to-ground fault current detector portion. When energized, this impedance transforming means presents a low input impedance to the secondary winding causing it to perform in a current-transformer mode. It is adapted to trip a circuit breaker in the AC power line when the secondary winding current, caused by a hot-line-to ground fault exceeds a predetermined value.

The detector includes a neutral-wire-to-ground fault sensing means, that when energized senses via the transformer the magnitude of the neutral-wire-to-ground fault resistance and trips the breaker when this fault resistance falls below a predetermined value.

A multiplexing switching means in the detector periodically energizes the impedance-transforming means while simultaneously de-energizing the neutral fault sensing means, and vice versa. The impedance transforming means is preferably directly connected, i.e. hard wired, to the secondary of the transformer without any intervening transistors or other switches to keep the impedance of the connection to a minimum.

BRIEF DESCRIPTION OF THE DRAWINGS

FIG. 1 shows a schematic of a ground fault interrupter of the prior art connected to an AC power line.

FIG. 2 shows a waveform of the voltage of the AC power line of FIG. 1.

FIG. 3 shows the voltage waveform on a DC supply buss (37) of FIG. 1 relative to the circuit reference buss 39.

FIG. 5 shows the voltage waveform of the voltage appearing at the top of the ringing capacitor (53) of FIG. 4.

FIG. 6 shows a portion of the voltage waveform of the voltage appearing across the transformer secondary winding 21 of FIG. 4 to the same time scale as that of FIG. 5.

FIG. 8A shows a simple general schematic of the impedance transforming circuit portion of FIG. 8.

FIGS. 7, 8 and 9 taken together represent the preferred embodiment of a ground fault detector of this invention, and is operable as detector 22 in the circuit of FIG. 1.

FIG. 10 shows the same voltage waveform as that of FIG. 6 (or on conductor 167 of FIG. 7) except to the same time scale as that of FIG. 2.

FIG. 11 shows the voltage waveform on conductor 256 of FIG. 8 to the same time scale as that of FIG. 2.

FIGS. 12 and 13 show the waveforms of charging (or discharging) current in the automatic bias adjusting circuit portion of FIG. 8, in the absence and in the presence of a hot-line-to-ground-fault, respectively.

FIG. 14 shows the ground fault interrupter included in the power cord plug housing.

DESCRIPTION OF THE PREFERRED EMBODIMENTS

Figure 4:
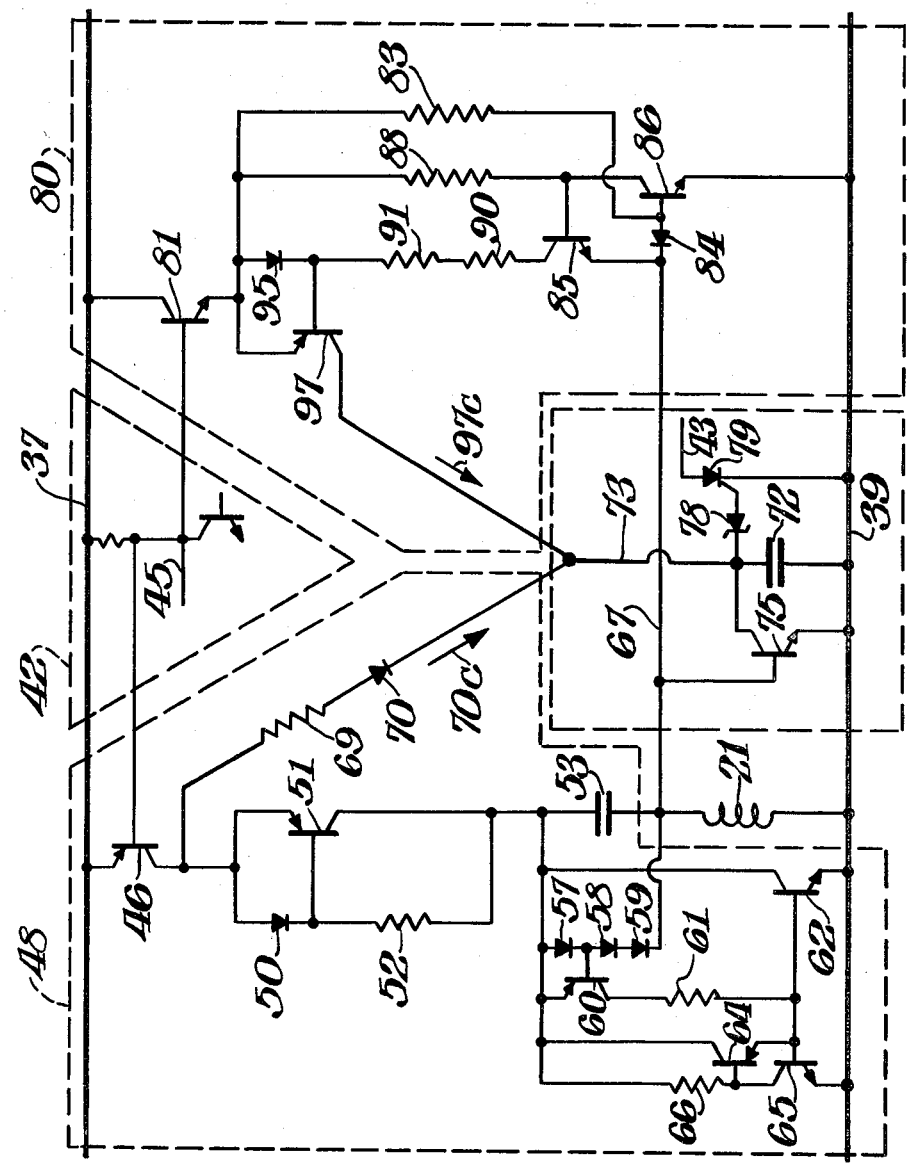
FIG. 4 shows a portion of a circuit diagram of a ground fault detector of this invention such as that (22) shown as a block in FIG. 1.

Embodiments of this invention are described and considered in conjunction with the circuit of FIG. 1. In a first embodiment, the core 20 is a ferrite toroid, type BBR 7950 supplied by Indiana General Corporation. Its permeability is about 7000. The secondary winding 21 has only 11 turns of fine wire. Two zener diodes 35 and 36 are connected across the output of the bridge 23 of diodes 24, 25, 26 and 27 to provide DC voltages of about +16 volts and +8 volts at busses 37 and 38, respectively, with respect to buss 39. Buss 39 is connected to solenoid 18 by detector 22 when a fault exists, as will be explained. Line voltage is supplied to the bridge 23 through series resistor 28 and solenoid 17 drawing a much smaller current than that necessary to trip breaker 18.

The waveform 40 of a 60 Hz voltage that may be produced across lines 10 and 11 by power source 14 is shown in FIG. 2 to the same time scale as the waveform 41 in FIG. 3 of the voltage appearing at buss 37 relative to buss 39. The times $t_z$ in waveform 41 during which the voltage is less than +17 volts, occur near the times of zero crossing of waveform 40. Time $t_z$ is typically about half a millisecond.

In the simple detector circuit shown in FIG. 4, some preferred biasing circuits and means for multiplexing are omitted for clarity in the initial description of major features of the invention that follows. The components and busses of FIG. 4 are identified by the same numerals as those of the corresponding parts in FIG. 1, where appropriate.

With reference to the incompletely illustrated multiplex switching circuit 42 of FIG. 4, when a low voltage is applied to conductor 45, transistor 46 conducts and activates the N-GF circuit 48 and transistor switch 81 is held off deactivating the H-GF circuit 80. This condition corresponds to periods B that are indicated in FIG. 3 in time relationship to the power line voltage waveform 40 of FIG. 2. On the other hand, when the voltage applied to conductor 45 rises to about that of the buss 37, then transistor 81 conducts and transistor 46 is off, corresponding to the periods A in FIG. 3. Thus, at a time, designated $t_1'$, a period B is initiated. DC power being applied to activate the neutral line to fault (N-GF) detector circuit 48, the current source comprising diode 50, transistor 51 and resistor 52 begins to deliver current of a predetermined constant value through capacitor 53 and winding 21.

A magnified waveform 54 in FIG. 5 of the voltage appearing at the top of capacitor 53 occurs in the period B. The capacitor 53 charges until at $t_1''$ its voltage exceeds the $3V_{BE}$ of diodes 57, 58 and 59 (about 1.8 volts). This turns on transistor 60 and consequently through resistor 61 turns on transistor 62 at $t_1''$, connecting the capacitor 53 in parallel with the secondary winding 21. This parallel combination forms an energized resonant tank circuit that begins to ring. At the same time $t_1''$, the latch circuit comprising transistors 64 and 65 and resistor 66 is activated and holds or latches transistor 62 on until the voltage across the latch (waveform 54 of FIG. 5) drops to about half a volt at $t_1'''$. This will occur after about a half cycle of the ringing signal is complete. The capacitor 53 begins to charge again and this process is repeated a number of times as is indicated in FIG. 5, until power is interrupted to the N-GF circuit 48 when transistor 46 is switched off.

At the same time, $t_1'$, that transistor 46 turns on, a current $70c$ begins to flow through current limiting resistor 69 and diode 70 to charge integrating capacitor 72 via conductor 73.

Normally, this capacitor is periodically discharged during periods $t_1''$ to $t_1'''$, $t_1''''$ to $t_1'''''$, etc., since when there is no N-GF, then the peak ringing voltage (waveform 44B of FIG. 6) is great enough to turn on transistor 75 and discharge integrating capacitor 72. However, when there exists a neutral-line-to-ground fault (N-GF) of predetermined severity, the peak of the ringing voltage 44B appearing on conductor 67 is less than enough (illustrated by dashed line 68f in FIG. 6) to turn on transistor 75 when the N-GF is about 2 ohms or less. Such a fault essentially shunts the secondary winding 21 by a resistance that is the value of fault resistor 31 times the square of the transformer turns ratio, reducing the Q of the ringing tank circuit. In the later event, the voltage of capacitor 72 eventually builds to a value that will breakdown the zener diode 78 to fire the controlled rectifier 79 and through conductor 43 trip the breaker 17 (of FIG. 1). When the resistance of fault 31 is less than 2 ohms, tripping occurs within one period B or at most 8.3 milliseconds. The voltage spikes 68s are of such a brief duration that they are not capable of so discharging the capacitor 72.

In the above described N-GF detection circuit 48, shunting transistor 62 during ringing intervals, e.g. $t_1''$ to $t_1'''$, is not fully saturated and initially, at $t_1''$, has a collector to emitter voltage (see FIG. 3) of about 0.6 volts ($V_{BE}$ of transistor 65) plus 0.1 volts (the saturated collector to emitter voltage of transistor 64) amounting in sum to 0.7 volts. When (at $t_1'''$) the voltage 54 drops to about 0.5 volts, the latch comprised of transistors 64 and 65 can no longer hold the shunting transistor 62 conducting; tank circuit comprised of capacitor 53 and winding 21 is opened; and the capacitor 53 begins to charge again.

During the portion of each half cycle of the power line voltage designated period B, the capacitor 53 is repeatedly charged and connected across the winding 21. This preferably occurs during each period B from 5 to 10 times. Noise that may be of polarity so as to diminish the amplitude of a few of the ringing voltage peaks (waveform 44B in FIG. 6) when no N-GF is present will not inadvertently cause the breaker 17 to trip. Since noise usually consists of relatively narrow spikes, when it is of the other polarity it cannot inadvertently turn on transistor 75 for a long enough time to substantially discharge capacitor 72 and prevent breaker 17 from being tripped when a N-GF is present. The N-GF detector of this invention, providing about a half cycle of ringing 5 to 10 times during a portion of each half cycle of the power line voltage, may advantageously employ a relatively low ringing frequency e.g. 0.8 to 2.0 KHz, that is very low compared to the major frequencies of power line noise. During the capacitor (53) charging intervals, the L-C (21-53) series resonant circuit has such a low Q, being in series with the high impedance current source (including transistor 51), that noise energy cannot be stored there. During a ringing interval, e.g. $t_1''$ to $t_1'''$, a noise spike may distort the ringing signal 68f at that interval without affecting it at all in the other ringing intervals, e.g. $t_1''''$ to $t_1'''''$. This circuit is seen to reduce the probability that noise will interfere with normal functioning of the N-GF detector, using frequency discriminating circuits and statistical sampling (averaging).

A hot-line-to-ground-fault detector circuit 80 is activated during periods A. When transistor switch 81 turns on, current is drawn through bias resistor 83. This causes diode 84 and transistors 85 and 86 to conduct. Transistor 85, having its emitter connected to buss 67 and thus to signals appearing across secondary winding 21, serves as an impedance transforming stage that presents a low input impedance to the input signal source, namely secondary winding 21, and transmits the emitter current essentially undiminished to its high impedance collector. This hot-line-to-ground-fault impedance transformer is caused to present an even lower input impedance by the action of the transistor 86; i.e. when buss 67 tends to go more negative, the collector of transistor 86 tends to go more positive diverting additional current from resistor 88 to the base of transistor 85 and thus cause the transistor 85 to conduct more strongly.

The output signal current from the collector of transistor 85 is substantially equal to the input fault signal current from secondary winding 21. It may be amplified by the current mirror circuit that includes resistors 90 and 91, diode 95 and transistor 97. Current amplification is proportional to the ratios of the base emitter junctions of the latter two transistors. This output current 97c is substantially proportional to the signal current from the secondary winding 21, and proportional to the conductance of H-GF resistor 30 (FIG. 1). The charging rate of integrating capacitor 72, and the speed with which it will reach the voltage necessary to fire the controlled rectifier 79 and trip the breaker 17, is thus directly related to the H-GF current amplitude.

This novel impedance transforming circuit (transistor 85) with feedback (through transistor 86) is capable of providing an input impedance of only a fraction of an ohm. Consequently, the signal voltage appearing at the input of the transforming circuit (i.e., emitter of transistor 85) is very small indeed, and the differential transformer made up of the power lines 10 and 11 as primary windings, the core 20, and secondary winding 21 performs as a current transformer during periods (A) of hot-line-to-ground-fault (H-GF) detection. Thus the magnetic properties of the core are not critical so long as the permeability is high, e.g., greater than about 1000. The turns ratio determines the ratio of the magnitudes of the actual differential fault current in the primaries 10 and 11 to the current flowing in the secondary winding 21 and through the low input impedance of the circuit 80. When circuit 80 is de-energized, during periods for which transistor 81 is off, the input impedance of circuit 80 is high and does not load the secondary winding 21 during periods B of neutral-line-to-ground-fault (N-GF) detection. During periods A, the low input impedance of the circuit 80 holds the voltage 43A at conductor 67 near zero even in the presence of a H-GF.

Figure 7:
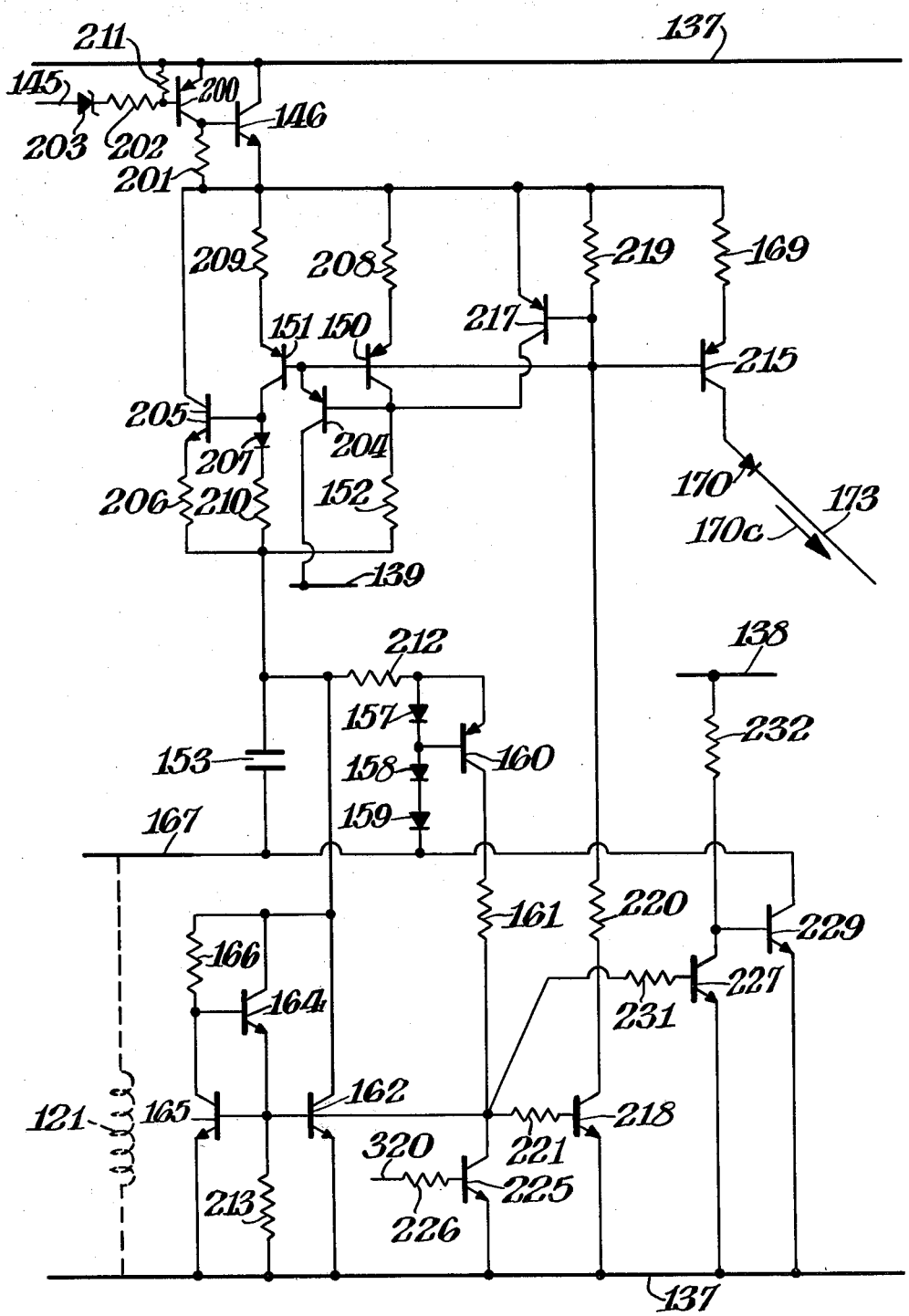
FIG. 7 shows a circuit diagram of a more fully developed and preferred neutral-wire-to-ground-fault detector portion of a ground fault interrupter.
Figure 8:
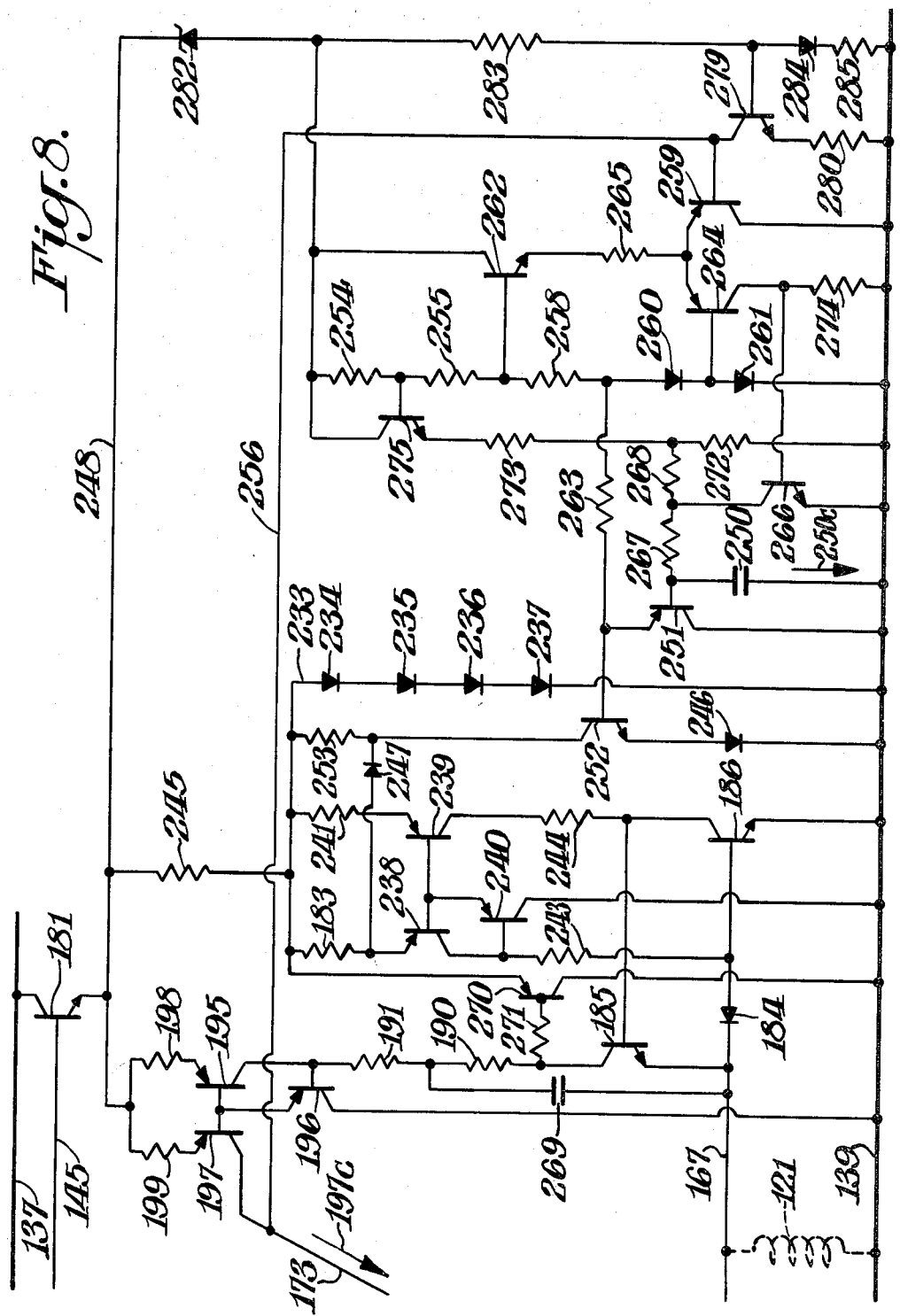
FIG. 8 shows a circuit diagram of a more fully developed and preferred hot-wire-to-ground-fault detector portion of a ground fault interrupter.
Figure 84:
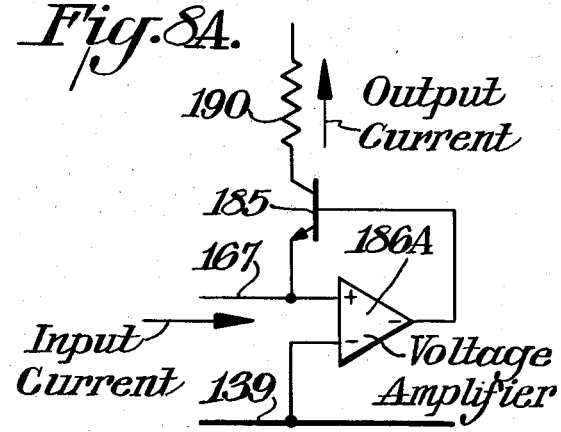
Figure 9:
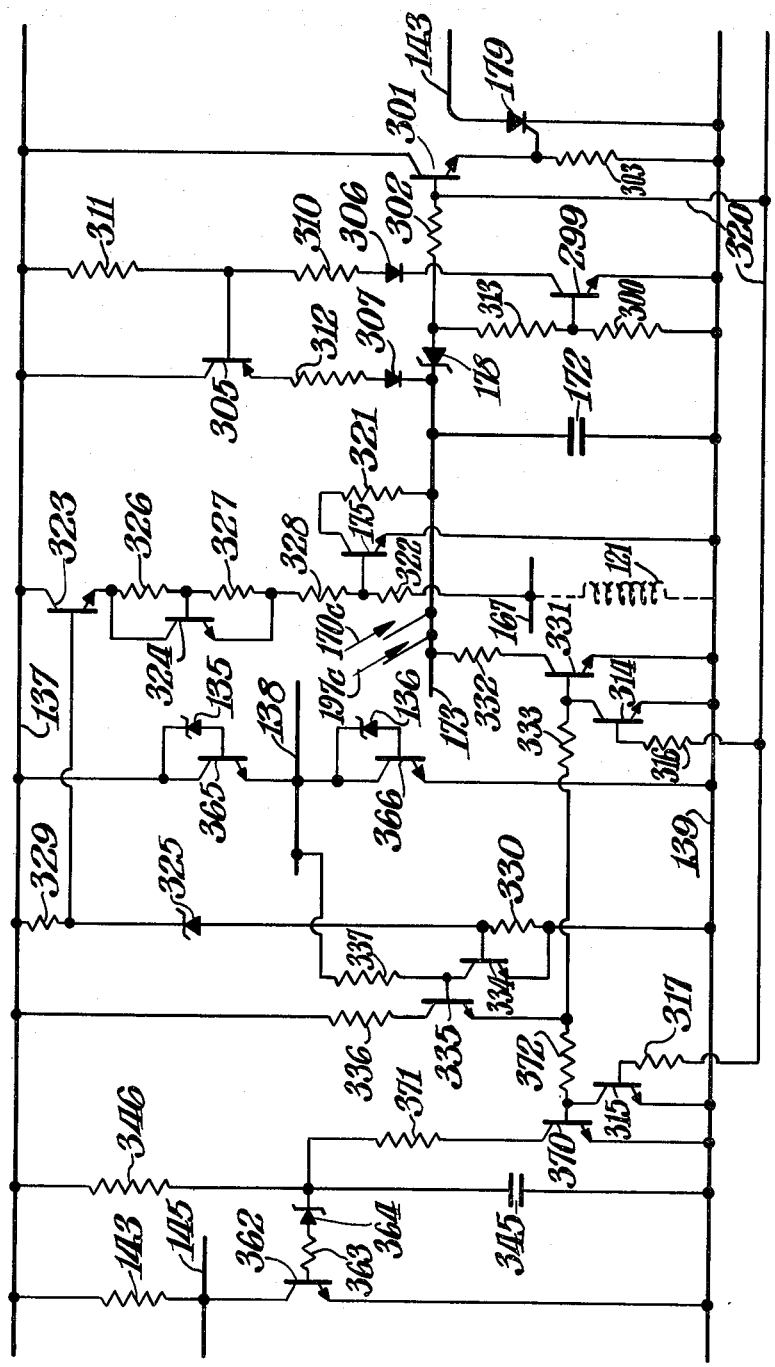
FIG. 9 shows a circuit diagram of a preferred time multiplexing switching circuit portion and breaker triggering circuit portion of a ground fault interrupter.

The circuit of FIG. 4 is a simplified version of a more sophisticated ground fault detector circuit that performs by the same principles. The latter comprises the preferred embodiment which was built and operated. Functional portions of this preferred circuit are shown in FIGS. 7, 8 and 9. In the latter three figures, the components having corresponding ones in FIGS. 1 and 4 are designated by the same numerals except having 100 added thereto. Other components for which there are no directly corresponding ones in FIG. 4 are designated by numerals that are greater than 200.

The neutral-line-to-ground-fault detector circuit of FIG. 7 becomes activated when, at time $t_1'$, transistors 146 and 200 turn on responding to a low voltage on multiplexing signal conductor 145. The two stage current source made up of transistors 150, 151, 204 and 205, diode 207 and resistors 152, 208, 209, 210 and 206, charges capacitor 153 through secondary winding 121 via conductor 167. A voltage threshold circuit includes diodes 157, 158 and 159, transistor 160, and resitors 161 and 212. The shunting and latching functions are performed by transistors 162, 164 and 165, and resistors 166 and 213.

The integrating capacitor 172, shown in FIG. 9, is charged via conductor 173 by a current 170c through resistor 169, diode 170 and transistor 215. Transistor 215 operating in conjunction with current reference transistor 150 provides the charging current 170c having a constant predetermined value of about 0.25 milliamperes.

The circuit including transistors 217 and 218 and resistors 219 and 220 is activated only when transistor 160 is on, e.g., from $t_1''$ to $t_1'''$, so that during each ringing period, the current sources of transistors 151 and 205 are turned off. This insures that current which would otherwise flow through these transistors 151 and 205 and subsequently through the activated latching transistors 162, 164 and 165, does not tend to lock the latter in the on state with the help of power line noise that may appear across the secondary winding 121.

The function of transistor 225 relates to multiplexing and timing and is described further below.

Transistor 229 is normally off during ringing intervals (e.g. $t_1''$ to $t_1'''$) and turns on at the end of such intervals (e.g. $t_1'''$) to reduce the spike 68s (FIG. 6) and practically eliminate its influence on the signal produced at buss 167.

The voltage appearing on conductor 167 during period B, illustrated in detail in FIG. 6, is shown as waveform 214 in FIG. 10 in time correspondence to the waveform 40 of line voltage in FIG. 2.

The hot-line-to-ground-fault detector of FIG. 8 is activated by transistor switch 181 when a high voltage signal is applied to conductor 145. The positive going supply buss 137 is connected via resistor 245 to conductor 233 that is subsequently clamped at 4 $V_{BE}$ (about 2.8 volts) by diodes 234, 235, 236 and 237. A current flowing through resistor 183 causes diode transistor 184 and 186 to conduct and the current mirror circuit including transistors 238, 239 and 240 and resistor 241 is activated. This current mirror circuit serves as an active load at the collector of transistor 186. This allows the use of a low supply voltage at conductor 233 providing isolation from conductor 248 and further noise immunity. It also helps establish the DC operating conditions for transistors 185 and 186. Other voltage amplifier circuits, especially ones providing higher gain, may be substituted for that of transistor 186.

The impedance transforming circuit portion of this invention can be more generally appreciated from the schematic of FIG. 8A. The input impedance as seen between conductor 167 and reference buss 139 is approximately $R_{in} \simeq (r_e/G)$ where $r_e$ is the emitter resistance of transistor 185 and G is the voltage gain of the feedback voltage amplifier 186A. Since the value of $r_e$ is inversely related to the emitter current (transistor 185), then the input impedance will be reduced by an increase in the emitter bias current and/or an increase in the feedback gain, G.

A bias control circuit is provided that senses the voltage across integrating capacitor 172 (FIG. 9) at conductor 173 and, responding slowly, automatically adjusts the amplifier biasing conditions by modifying, via diode 247 (FIG. 8), the voltage appearing at the emitter of transistor 238 to maintain the sensed voltage at a predetermined level. Briefly, the biasing circuit shown in FIG. 8 performs as follows.

During periods A, a positive voltage appears on conductors 233 and 248. It will first be assumed that capacitor 250 is charged to a voltage that during such periods A holds transistors 251 and 252 just enough conducting that the resulting current through resistor 253 causes diode 247 to be forward biased and the bias currents in the hot-line-to-ground-fault amplifier is maintained at the ideal level, namely at a level at which a H-GF current of 5 milliamperes will just trip the breaker. Under this condition, the amplifier is fully operational (biased class A), it's input impedance is assured of being a low value, but its output current 197c has a constant low value (during each period A). This low current, in the absence of a fault (H-GF) charges the integrating capacitor 172 producing a voltage waveform 257 (solid line in FIG. 11) that is essentially a ramp function during periods A. This voltage across capacitor 172 is applied via conductor 256 to the base of transistor 259.

At the initiation $t_x$ of each period A, this transistor 259 is held on by the low voltage on conductor 256. As this voltage becomes more positive, it eventually turns off transistor 259 (when the ramp voltage of waveform 257 reaches the $V_{BE}$ of the reference diode 261). The current in the collector of transistor 264 then increases sharply turning on transistor 266, and capacitor 250 begins to discharge (slowly, with time constant of about 8 cycles of the power line voltage) through the 1 megohm resistor 267. Prior to the turning on of transistor 266 capacitor 250 had been charging (slowly) through resistors 267 and 268 from the network including resistors 272 and 273 and transistor 275. The average value of the voltage across capacitor 250 is thus determined by its charging time, namely the percentage of each period A during which transistor 266 is not discharging it. That in turn is determined by the rate at which the voltage (waveform 257) across the integrating capacitor 172 increases or ramps up. The rate of the ramping up in waveform 257 corresponding to the aforementioned desired amplifier biasing condition is established at a value about half that which would be effective in tripping the breaker 17 at the very end of a period A.

The proper biasing is maintained by this circuit even when a fault current exists, which fault is less than enough to trip the breaker 17, because if in a given period A this 60 Hz fault current produces a current that is in a direction to increase the current in the emitter of transistor 185, the voltage across integrating capacitor 172 (FIG. 9) ramps up more rapidly as in the first 16 millisecond period of waveform 277 in FIG. 11, but in the following period A the fault current reverses polarity and causes a decrease in the rate of ramping as in the second 16 m.sec. period of waveform 277. The total effect is to maintain the average voltage on capacitor 250 at the same level. The coressponding periods of charging and discharging capacitor 250 are indicated in FIGS. 12 and 13, with no fault and with a fault, respectively. When there is no H-GF fault, the ratio of charging to discharging times remains the same in all periods A. Note that H-GF detection occurs only every other period A, namely during those half cycles of the power line voltage that are negative going as seen in FIG. 2. Thus, the longest time that may occur between the instant a H-GF current (greater than 5 ma. in the hot-wire 10) first appears and the time of tripping the breaker 17 is about 1.5 half periods of the power line voltage or 25 milliseconds.

Transistor 279 (FIG. 8) serves to sink some current from current mirror (transistors 197 and 198). The remaining components of this circuit have recognizable functions.

With reference to FIG. 9, charging currents (170c and 197c) from either the neutral-line-to-ground-fault detector circuit of FIG. 7 or from the hot-line-to-ground-fault detector circuit of FIG. 8 charge the integrating capacitor 172 via conductor 173. Either a H-GF or a N-GF may cause the voltage across this charging capacitor to reach the voltage necessary to break down the zener diode 178, e.g., the zener voltage plus $V_{BE}$ of transistor 299. (This zener voltage is preferably 5.8 volts). The amplifier circuit including transistor 301 and resistors 302 and 303 may not turn on fully at the first instant that the zener diode 178 breaks down. However, transistor 305 will have turned on and a latch circuit including transistors 299 and 305, diodes 306 and 307, and resistors 300, 310, 311, 312, and 313, will supply additional current through the then turned-on transistor 305 to increase the rate of further charging the integrating capacitor 172. Shortly thereafter, transistor 301 will be caused to turn fully on and the controlled rectifier 179 will fire to actuate the breaker via conductor 143.

Also, at the instant that transistor 301 turns on, the voltage at conductor 320 rises and being connected to the base of transistor 225 in the N-GF detector circuit of FIG. 7, will turn on transistors 225 that will in turn turn off latch transistors 162 and 164 to prevent any ringing that may exist at that time from turning on transistor 175 via conductor 167. Further at the instant conductor 320 goes positive and turns on transistor 301 (when a fault has been detected), transistors 314 and 315 (FIG. 9) are turned on by the positive voltage appearing on conductor 320, holding transistors 331 and 370 off, respectively. Transistors 370 and 331 are normally held off anyway except during the brief periods $t_z$ of about a millisecond each, during which the sinusoidal voltage of the power lines (e.g., 10 and 11 of FIG. 1) changes polarity, namely each half cycle of the power line frequency, 60 Hz. At this time (during each $t_z$) transistors 370 and 331 are briefly turned on (for about the first and last quarter of each period $t_z$) by the signal generated at the emitter of transistor 335 via the circuit including transistor 334, zener diode 325, and resistors 329, 330, 336 and 337. This provides the resetting discharge of the integrating capacitor 172 via conductor 173 at the end of each half cycle of the power line voltage and a similar resetting of multiplex timing capacitor 345. However, after a ground fault has caused transistor 301 to turn on, transistors 370 and 331 are prevented from resetting the integrating capacitor 172, and timing capacitor 345.

It will be appreciated that this or any circuit capable of detecting fault currents on a power line as small as 5 milliamperes will tend to be susceptible to power line noise. The integration of the line frequency fault signals and also the high frequency noise signals helps to ameliorate this problem but large noise spikes may still cause false tripping or on the other hand temporarily desensitize the GFI circuit.

Noise, as well as hot line fault current, tends to appear as current in the secondary winding 121 as long as the hot line fault amplifier is active and its input impedance is low. An impulse of noise current in conductor 167 does not terminate quickly, but rather is sustained by the large ratio of inductance (of secondary winding 121) and the low amplifier input impedance.

Two noise rejection means are present in the circuit of FIG. 8, each of which momentarily raises the input impedance of the amplifier in response to a noise current impulse.

The first means consists of capacitor 269 being connected from the emitter to a point in the collector circuit of transistor 185. Capacitor 269, being resistively coupled to the collector of transistor 185, responds only to fast going noise signals and not to the much lower frequency (60 Hz) of normal fault currents.

The second noise rejection means consists of transistor 270 with base resistor 271. When a noise spike appears of such a polarity to cause the emitter of transistor 185 to go negative, this input transistor tends toward saturation and the amplifier input impedance tends to be maintained at a low value by the feedback current amplifier consisting of transistors 186, 238, 239 and 240, supplying the needed current through the base of transistor 185. This is prevented by transistor 270 which is normally off but turns on when the collector voltage of transistor 185 drops to an abnormally low value, as will be the case for a large "negative" noise impulse. When transistor 270 turns on, the supply voltage at conductor 233 (normally about 2.8 volts) to the feedback current amplifier is removed, the H-GF amplifier input impedance jumps upward, the impulse of noise current is quickly dissipated due to the much larger L/R ratio that is effected.

The function of transistor 175 (FIG. 9) is to periodically, discharge the integrating capacitor 172 through resistor 321, during periods B, in response (via resistor 322) to the large ringing signals appearing on conductor 167 when there is no neutral to ground fault.

Transistor 175 is otherwise held only slightly conducting by the bias network including transistors 323 and 324 and resistors 326, 327, and 328. This bias is removed when transistor 323 turns off during periods $t_z$ to avoid any loss of fault induced charge that may have accumulated on integrating capacitor 172 at those brief moments ($t_z$) when the circuit is without power.

The voltage on busses 137 and 138 have the same waveform that ramps to near zero and back up to 16 and 8 volts, respectively, during the period $t_z$. Due to the voltage offsetting action of zener diode 325, transistor 334 turns off first when the voltage on buss 138 has fallen to about 4 volts at which time transistor 335 turns on. Transistor 331 is turned on to discharge capacitor 172 through resistor 332.

At the same time transistor 370 is turned on to discharge and fully reset the timing capacitor 345 for the beginning of a new period A.

The capacitor 345 charges through resistor 346 (beginning just after time $t_1$ or $t_2$ etc.) and when the voltage across capacitor 345 reaches about 8.5 volts (voltage of zener 364 and $V_{BE}$ of transistor 362) the multiplexing switch transistor 362 turns on, terminating a period A and initiating a period B.

Except for a few components designated D for "discrete", the components shown in FIG. 7, 8 and 9 are included in a single silicon integrated chip. Components of FIGS. 1, 7, 8 and 9 are listed in the Table below along with their values when appropriate. All of the integrated transistors have a standard geometry except those designated 2x and 4x that have base-emitter junction areas twice and four times as large, respectively, as the undesignated standard ones. The integrated diodes are formed by shorting the base and collector of an integrated transistor. All transistors listed are NPN unless designated PNP.

TABLE

TRANSISTORS

| | | | |
|---|---|---|---|
| 146 | 196 PNP | 239 2× PNP | 301 2× |
| 150 PNP | 197 PNP | 240 PNP | 305 4× PNP |
| 151 PNP | 200 PNP | 251 PNP | 314 |
| 160 PNP | 204 | 252 | 315 |
| 162 | 205 PNP | 259 PNP | 323 |
| 164 4× PNP | 215 PNP | 262 | 324 |
| 165 | 217 PNP | 264 PNP | 331 |
| 175 | 218 | 266 | 334 |
| 181 | 225 | 270 PNP | 335 |
| 185 | 227 | 275 | 362 |
| 186 2× | 229 | 279 | 365 |
| 195 2× PNP | 238 2× PNP | 299 | 366 |
| | | | 370 |

DIODES

| | | |
|---|---|---|
| 24 D 1N64 | 170 | 236 |
| 25 D 1N64 | 179 | 237 |
| 26 D 1N64 | 184 2× | 246 |
| 27 D 1N64 | 207 | 260 |
| 157 | 233 | 261 |
| 158 | 234 | 306 |
| 159 | 235 | 307 |

ZENER DIODES

| | |
|---|---|
| 135 | 282 |
| 136 | 284 |
| 178 | 325 |
| 203 | 364 |

CAPACITORS

| | Capacitance (μFd) |
|---|---|
| 269 D (noise rejecting) | 0.01 |
| 250 D (H-GF biasing) | 0.64 |
| 153 D (N-GF charging) | 0.33 |
| 345 D (multiplex timing) | 0.15 |
| 172 D (integrating) | 0.1 |

RESISTORS

| | Resistance (in 1000's of ohms) | | Resistance (in 1000's of ohms) |
|---|---|---|---|
| 28 D | 80 (1.2 watts) | 258 | 12 |
| 143 | 30 | 263 | 30 |
| 152 | .500 | 265 | 7.5 |
| 161 | 2 | 267 D | 1000 |
| 166 | 24 | 268 | 20 |
| 169 | .900 | 271 | 4 |
| 183 | .500 | 272 | 35 |
| 190 | 1.2 | 273 | 15 |
| 191 | 5.6 | 274 | 10 |
| 198 | 1 | 280 | .330 |
| 199 | 2 | 283 | 24 |
| 201 | 24 | 285 | .400 |
| 202 | 30 | 302 | 20 |
| 206 | 51 | 303 | .400 |
| 208 | 1 | 310 | 30 |
| 209 | 1 | 311 | 24 |
| 210 | 10 | 312 | 2 |
| 211 | 30 | 316 | 18 |
| 212 | 3 | 317 | 18 |
| 213 | 15 | 322 | .620 |
| 219 | 24 | 326 | 27 |
| 220 | 33 | 327 | 3.9 |
| 221 | 1 | 328 | 3.9 |
| 226 | 18 | 329 | 20 |
| 231 | .500 | 330 | 22 |
| 232 | 18 | 331 | 7 |
| 241 | .500 | 332 | 0.2 |
| 243 | 2.2 | 333 | 13 |
| 244 | 2.2 | 336 | 3.6 |
| 245 | 13 | 337 | 30 |
| 253 | 7 | 346 D | 50 |
| 254 | 14 | 363 | 10 |
| 255 | 3.5 | 371 | .900 |
| | | 372 | 2 |

The GFI protected power cord illustrated in FIG. 14, the plug 385 has pins 386 and 387 that may be plugged into an AC power outlet in either of two polarities. The housing of the plug 385 includes a ground fault interrupter (GFI) 400 of this invention with the components illustrated in FIG. 1 except the source 14 and load 13. Pins 386 and 387 correspond to terminals 14a and 14b. The cord 390 has an insulative outer sheathing 391 containing two insulated power line wires 396 and 397, corresponding to wires 10 and 11 in FIG. 1, the ends of which may be connected to a load, such as a domestic clothes washing machine.

What is claimed is:

1. An alternately low and high input impedance detector, for use in a ground fault interrupter of the type comprising a circuit breaker in an AC voltage power line and a differential transformer having a secondary winding and two equal turn primary windings that are adapted to connect a "hot" wire and a "neutral" wire of said power line from a power source to an electrical load, comprising an impedance-transforming signal-transmitting means having an input for being directly connected across said secondary winding, for presenting, when energized, a low input impedance to said secondary winding to cause said differential transformer to behave as a current transformer, for tripping said breaker when a hot-wire-to-ground-fault causes a fault current exceeding a predetermined value, and for presenting, when not energized, a high input impedance to said secondary winding, said impedance transforming means including a first bipolar transistor having an emitter that is coincident with the input of said impedance transforming means, an inverting voltage amplifier having an input connected to said emitter and an output connected to the base of said first transistor to reduce the input impedance thereof and to produce an output current at the collector of said first transistor that is directly related to said fault current and effects said tripping of said breaker.

2. The detector of claim 1 wherein said inverting voltage amplifier is comprised of a second bipolar transistor of the same polarity type as that of said first transistor and a diode being connected between the emitter and base of said first and second transistors, respectively, in such a direction that an input signal of one polarity at said first transistor emitter will tend to cause said first and second transistors to conduct more and less strongly, respectively, the collector of said second transistor being connected to a high impedance load and to the base of said first transistor.

3. The detector of claim 1 wherein said low input impedance is less than 0.5 ohms.

4. The detector of claim 1 wherein said impedance transforming means additionally includes a fault signal integrating capacitor adapted to be charged at a rate directly related to the first transistor collector current; and a breaker tripping means for effecting said tripping when the voltage across said integrating capacitor exceeds a predetermined value.

5. The detector of claim 4 wherein said impedance-transforming means is additionally for providing from a high output impedance a signal current that is substantially proportional to the current of power line frequency that may exist in said secondary winding, said high impedance output being connected to said integrating capacitor.

6. The detector of claim 1 additionally comprising a neutral-wire-to-ground-fault sensing means being connected to said secondary winding for, when energized, sensing via said differential transformer the magnitude of a neutral-wire-to-ground-fault resistance and tripping said breaker when said magnitude falls below a predetermined value.

7. The detector of claim 6 additionally comprising a multiplexing switching means for periodically energizing said impedance-transforming means during periods A and during other periods B de-energizing said impedance-transforming means, and simultaneously de-energizing and energizing, respectively, said neutral-wire-to-ground-fault sensing means.

8. The detector of claim 7 wherein said multiplexing switching means is additionally for synchronizing said periods A with about the first half of each half-cycle of said AC voltage, and synchronizing said periods B with about the last half of each half-cycle of said AC voltage.

9. The detector of claim 7 wherein said neutral-wire-to-ground-fault sensing means is comprised of
  (a) a ringing capacitor;
  (b) a capacitor switching means for, during each of said periods B, alternately and repeatedly connecting and disconnecting said capacitor across said secondary winding;
  (c) a charging means for charging said ringing capacitor in each interval between an incidence of said connecting and subsequent disconnecting, whereby during each other interval between an incidence of said disconnecting and subsequent connecting a ringing voltage appearing across the paralleled secondary winding and ringing capacitor has an amplitude that is inversely related to the magnitude of said neutral-wire-to-ground fault resistance.

10. The detector of claim 9 wherein said neutral-wire-sensing means is additionally for effecting said breaker tripping when the average magnitude of said ringing voltage during each period B falls below a predetermined value.

11. The detector of claim 9 wherein said disconnecting is effected after about the first half cycle of said ringing.

12. The detector of claim 10 wherein said connecting and disconnecting of said ringing capacitor is repeated from 5 to 10 times during said each period that said neutral-wire-to-ground-fault-sensing means is energized.

13. The detector of claim 10 wherein said impedance transforming means additionally includes a bias adjustment means for adjusting the bias currents in said first transistor to maintain at a predetermined value the average value of integrating capacitor voltage over many successive periods during which said impedance transforming means is energized.

14. The detector of claim 1 wherein said impedance-transforming means is additionally for tripping said breaker only when said fault current is of one polarity.

15. A ground fault interrupter comprising:
  (a) a differential transformer having a secondary winding, and having two equal turn primary windings that are adapted to connect a "hot" wire and the neutral wire, respectively, of an AC power line between an AC energy source and an electrical load;
  (b) an impedance-transforming signal transmitting means having an input connected across said secondary winding for presenting, when energized, a low input impedance to cause said differential transformer to perform as a hot-wire-to-ground-fault current transformer and for producing from a high output impedance an output current that is proportional to the current at said input, and for presenting, when not energized, a high input impedance to said secondary winding, said impedance transforming means being comprised of a first bipolar transistor having an emitter and a collector corresponding respectively to said input and output of said impedance transforming means, and an inverting feedback amplifier connected from said emitter to the base of said first transistor;
  (c) a neutral-wire-to-ground-fault detector means being connected to said secondary winding for, when energized, providing an output signal of a magnitude that is directly related to the value of a ground-to-neutral-fault resistance that may exist between the neutral line at said load and ground;
  (d) a switching means for periodically energizing said impedance-transforming means during some periods A and during other periods B de-energizing said impedance-transforming means, and simultaneously de-energizing and energizing, respectively, said neutral-wire-to-ground-fault detector means; and
  (e) a breaker means for breaking said power line when during said periods A said output current from said impedance-transforming means exceeds a predetermined value and when during said periods B said output signal from said neutral-wire-to-ground-fault detecting means falls below a predetermined value.

16. The ground fault interrupter of claim 15 wherein said differential transformer includes a magnetic toroidal core having a permeability of greater than 1000.

17. The ground fault interrupter of claim 16 wherein said secondary winding is comprised of no more than 15 turns of wire on said core.

18. The ground fault interrupter of claim 17 wherein said secondary winding is comprised of about 11 turns of wire.

19. The ground fault interrupter of claim 16 wherein each of said primary windings is comprised of one turn of wire.

20. The ground fault interrupter of claim 15 wherein said breaker means is comprised of an integrating capacitor that is connected to the output of said impedance-transforming means for charging said capacitor during said periods A at a rate directly related to the magnitude of a hot-wire-to-ground-fault current that may exist in said secondary winding.

21. The ground fault interrupter of claim 20 wherein said neutral-wire-to-ground-fault detector means is additionally for providing a constant charging current in said integrating capacitor during said periods B, and wherein said breaker means is additionally for shunting a portion of said constant charging current away from said integrating capacitor which portion is proportional to said output signal from said neutral-wire-to-ground-fault detector.

22. A power cord with ground fault interrupter comprising:
  I. A power cord, for making connection by one and the other ends of said cord, respectively, to an AC power outlet and an electrical load, said cord having two wires that are electrically insulated from each other; an electrically insulating sheath containing said wires, and a male plug at said one end of said cord being adapted to be plugged into said outlet and being electrically connected to said two wires; and II. A ground fault interrupter being attached at an intermediate point in said cord between said one and said other ends and comprising:

(a) a differential transformer having a toroidal magnetic core and a secondary winding of a plurality of fine turns wound on said core, each of said two wires of said cord being threaded once through said toroid to serve as primary windings of said transformer; and (b) an impedance-transforming signal transmitting means having an input connected across said secondary winding for presenting, when energized, a low input impedance to cause said differential transformer to perform as a hot-wire-to-ground-fault current transformer and for producing from a high output impedance an output current that is proportional to the current at said input, and for presenting, when not energized, a high input impedance to said secondary winding, said impedance transforming means being comprised of a first bipolar transistor having an emitter and a collector corresponding respectively to said input and output of said impedance-transforming means, and an inverting a feedback amplifier connected from said emitter to the base of said first transistor.

23. The power cord of claim 22 wherein said ground fault interrupter additionally comprises a neutral-wire-to-ground-fault detector means being connected to said secondary winding for, when energized, providing an output signal of a magnitude that is inversely related to the value of a ground-to-neutral-fault resistance that may exist between the neutral wire at said load and ground.

24. The power cord of claim 23 wherein said ground fault interrupter additionally comprises a switching means for periodically energizing said impedance-transforming means during some periods A and during other periods B de-energizing said impedance-transforming means, and simultaneously de-energizing and energizing, respectively, said neutral-wire-to-ground-fault detector means; and a breaker means for opening said power cord when during said periods A said output current from said impedance-transforming means exceeds a predetermined value and when during said periods B said output signal from said neutral-wire-to-ground-fault detecting means falls below a predetermined value.

* * * * *

UNITED STATES PATENT AND TRADEMARK OFFICE
CERTIFICATE OF CORRECTION

PATENT NO. : 4,378,579
DATED : March 29, 1983
INVENTOR(S) : Edward C. Hudson, Jr.

It is certified that error appears in the above—identified patent and that said Letters Patent is hereby corrected as shown below:

Column 7, line 39, "ing through resistor 183 causes diode transistor 184 and" should read -- ing through resistor 183 causes diode 184 and transistor --

Claim 12, line 1 (column 13, line 47), "claim 10" should read -- claim 9 --

Claim 13, line 1 (column 13, line 52), "claim 10" should read -- claim 9 --

Signed and Sealed this

Twenty-fourth Day of May 1983

[SEAL]

Attest:

DONALD J. QUIGG

Attesting Officer     Acting Commissioner of Patents and Trademarks